US012784686B2

(12) United States Patent
Kim

(10) Patent No.: US 12,784,686 B2
(45) Date of Patent: Nov. 3, 2026

(54) PIXEL CIRCUIT, DISPLAY DEVICE INCLUDING THE PIXEL CIRCUIT, AND ELECTRONIC DEVICE INCLUDING THE DISPLAY DEVICE

(71) Applicant: Samsung Display Co., Ltd., Yongin-Si (KR)

(72) Inventor: Eok Su Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/325,511

(22) Filed: Sep. 11, 2025

(65) Prior Publication Data

US 2026/0229175 A1 Aug. 6, 2026

(30) Foreign Application Priority Data

Jan. 31, 2025 (KR) ........................ 10-2025-0012304

(51) Int. Cl.
*G09G 3/00* (2006.01)
*G09G 3/32* (2016.01)
*G09G 3/3233* (2016.01)

(52) U.S. Cl.
CPC ............. *G09G 3/3233* (2013.01); *G09G 3/32* (2013.01); *G09G 2300/043* (2013.01); *G09G 2300/0819* (2013.01); *G09G 2310/08* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 9,205,857 | B2 | 12/2015 | Moriyama | |
| 2021/0343978 | A1* | 11/2021 | Okuzono | H10K 59/121 |
| 2023/0402007 | A1* | 12/2023 | Chae | G09G 3/3233 |
| 2025/0265953 | A1* | 8/2025 | Lin | G09G 3/006 |

* cited by examiner

*Primary Examiner* — Carl Adams
(74) *Attorney, Agent, or Firm* — Innovation Counsel LLP

(57) ABSTRACT

A pixel circuit may include a fourth transistor and a boosting capacitor. The fourth transistor may include a gate electrode receiving a first emission signal, a first electrode receiving a first power supply voltage, a second electrode connected to a second node, and a back gate electrode connected to a fourth node. The boosting capacitor may include a first electrode connected to the fourth node and a second electrode connected to the second node.

20 Claims, 14 Drawing Sheets

PIXEL CIRCUIT, DISPLAY DEVICE INCLUDING THE PIXEL CIRCUIT, AND ELECTRONIC DEVICE INCLUDING THE DISPLAY DEVICE

This application claims priority under 35 USC § 119 to Korean Patent Application No. 10-2025-0012304 filed on Jan. 31, 2025, in the Korean Intellectual Property Office (KIPO), the entire disclosure of which is incorporated by reference herein.

BACKGROUND

1. Field

Embodiments of the present inventive concept relates to a pixel circuit, a display device including the pixel circuit, and an electronic device including the display device. More particularly, the present inventive concept relates to a pixel circuit, a display device including the pixel circuit, and an electronic device including the display device for reducing a power consumption of a display panel.

2. Description of the Related Art

In general, a display device includes a display panel and a display panel driver. The display panel includes gate lines, data lines, emission lines, and pixels. The display panel driver includes a gate driver for providing gate signals to the gate lines, a data driver for providing data voltages to the data lines, an emission driver for providing emission signals to the emission lines and a driving controller for controlling the gate driver, the data driver, and the emission driver.

Each of the pixels may include a light emitting control transistor being turned on or off in response to the emission signal to control a light emission. For example, the light emitting control transistor may be an N-type transistor, and, in order for the light emitting control transistor to be turned on, a gate-source voltage of the light emitting control transistor should be greater than or equal to a threshold voltage of the light emitting control transistor. However, as the threshold voltage of the light emitting control transistor is large, a high level of the emission signal may increase, and a power consumption of the display panel may increase.

SUMMARY

Embodiments of the present inventive concept provide a pixel circuit for reducing a threshold voltage of a light emitting control transistor to reduce a power consumption of a display panel.

Embodiments of the present inventive concept provide a display device including the pixel circuit.

Embodiments of the present inventive concept provide an electronic device including the display device.

In an embodiment of a pixel circuit according to the present inventive concept, the pixel circuit comprises a first transistor including a gate electrode connected to a first node, a first electrode connected to a second node, and a second electrode connected to a third node, a second transistor including a gate electrode receiving a data write gate signal, a first electrode connected to a data line transmitting a data voltage, and a second electrode connected to the first node, a third transistor including a gate electrode receiving a reset gate signal, a first electrode receiving a reference voltage, and a second electrode connected to a fourth node, a fourth transistor including a gate electrode receiving a first emission signal, a first electrode receiving a first power supply voltage, a second electrode connected to the second node, and a back gate electrode connected to the fourth node, a boosting capacitor including a first electrode connected to the fourth node and a second electrode connected to the second node, and a light emitting element including an anode electrode connected to a fifth node, and a cathode electrode receiving a second power supply voltage.

In an embodiment, the first transistor, the second transistor, the third transistor, and the fourth transistor may be NMOS transistors.

In an embodiment, in a charging period, the third transistor may be turned on in response to a reset gate signal having a high level to provide the reference voltage to the fourth node, and the boosting capacitor may be charged by a voltage difference between the reference voltage and an initial voltage of the second node.

In an embodiment, in the charging period, the reference voltage may be greater than the initial voltage of the second node.

In an embodiment, in the charging period, a threshold voltage of the fourth transistor may decrease as the voltage difference between the reference voltage and the initial voltage of the second node increases.

In an embodiment, in an emission period after the charging period, the fourth transistor may be turned on when a voltage difference between a high level of the first emission signal and a voltage of the second node is greater than or equal to the threshold voltage of the fourth transistor.

In an embodiment, in the emission period, the voltage difference between the reference voltage charged by the boosting capacitor and the initial voltage of the second node may be maintained.

In an embodiment, the pixel circuit may further include a fifth transistor including a gate electrode receiving an anode initialization gate signal, a first electrode receiving an anode initialization voltage, and a second electrode connected to the fifth node.

In an embodiment, the pixel circuit may further include a sixth transistor including a gate electrode receiving a second emission signal, a first electrode connected to the third node, and a second electrode connected to the fifth node.

In an embodiment, the pixel circuit may further include a storage capacitor including a first electrode connected to the first node and a second electrode connected to the third node.

In an embodiment, the pixel circuit may further include a hold capacitor including a first electrode receiving the first power supply voltage and a second electrode connected to the third node.

In an embodiment, the first transistor may further include a back gate electrode connected to the third node.

In an embodiment of a display device according to the present inventive concept, the display device comprises a display panel including a pixel circuit and a display panel driver configured to drive the display panel. The pixel circuit includes a first transistor including a gate electrode connected to a first node, a first electrode connected to a second node, and a second electrode connected to a third node, a second transistor including a gate electrode receiving a data write gate signal, a first electrode connected to a data line transmitting a data voltage, and a second electrode connected to the first node, a third transistor including a gate electrode receiving a reset gate signal, a first electrode receiving a reference voltage, and a second electrode connected to a fourth node, a fourth transistor including a gate electrode receiving a first emission signal, a first electrode receiving a first power supply voltage, a second electrode connected to the second node, and a back gate electrode connected to the fourth node, a boosting capacitor including a first electrode connected to the fourth node and a second electrode connected to the second node, and a light emitting element including an anode electrode connected to a fifth node, and a cathode electrode receiving a second power supply voltage.

In an embodiment, the first transistor, the second transistor, the third-transistor, and the fourth transistor may be NMOS transistors.

In an embodiment, in a charging period, the third transistor may be turned on in response to a reset gate signal having a high level to provide the reference voltage to the fourth node, and the boosting capacitor may be charged by a voltage difference between the reference voltage and an initial voltage of the second node.

In an embodiment, in the charging period, the reference voltage may be greater than the initial voltage of the second node.

In an embodiment of an electronic device according to the present inventive concept, the electronic device comprises a display panel including a pixel circuit, and a display panel driver configured to drive the display panel. The pixel circuit includes a first transistor including a gate electrode connected to a first node, a first electrode connected to a second node, and a second electrode connected to a third node, a second transistor including a gate electrode receiving a data write gate signal, a first electrode connected to a data line transmitting a data voltage, and a second electrode connected to the first node, a third transistor including a gate electrode receiving a reset gate signal, a first electrode receiving a reference voltage, and a second electrode connected to a fourth node, a fourth transistor including a gate electrode receiving a first emission signal, a first electrode receiving a first power supply voltage, a second electrode connected to the second node, and a back gate electrode connected to the fourth node, a boosting capacitor including a first electrode connected to the fourth node and a second electrode connected to the second node, and a light emitting element including an anode electrode connected to a fifth node, and a cathode electrode receiving a second power supply voltage.

In an embodiment, the first transistor, the second transistor, the third transistor, and the fourth transistor may be NMOS transistors.

In an embodiment, in a charging period, the third transistor may be turned on in response to a reset gate signal having a high level to provide the reference voltage to the fourth node, and the boosting capacitor may be charged by a voltage difference between the reference voltage and an initial voltage of the second node.

In an embodiment, in the charging period, the reference voltage may be greater than the initial voltage of the second node.

According to the pixel circuit, the display device, and the electronic device, the pixel circuit may include the fourth transistor and the boosting capacitor. The fourth transistor may include the gate electrode receiving the first emission signal, the first electrode receiving the first power supply voltage, the second electrode connected to the second node, and the back gate electrode connected to the fourth node. The boosting capacitor may include the first electrode connected to the fourth node and the second electrode connected to the second node. The reference voltage applied to the fourth node may be greater than the initial voltage of the second node. Accordingly, the threshold voltage of the fourth transistor may decrease, the high level of the first emission signal may be lowered, and a power consumption of the display panel may decrease.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, the present inventive concept will be described in more detail with reference to the accompanying drawings.

Figure 1:
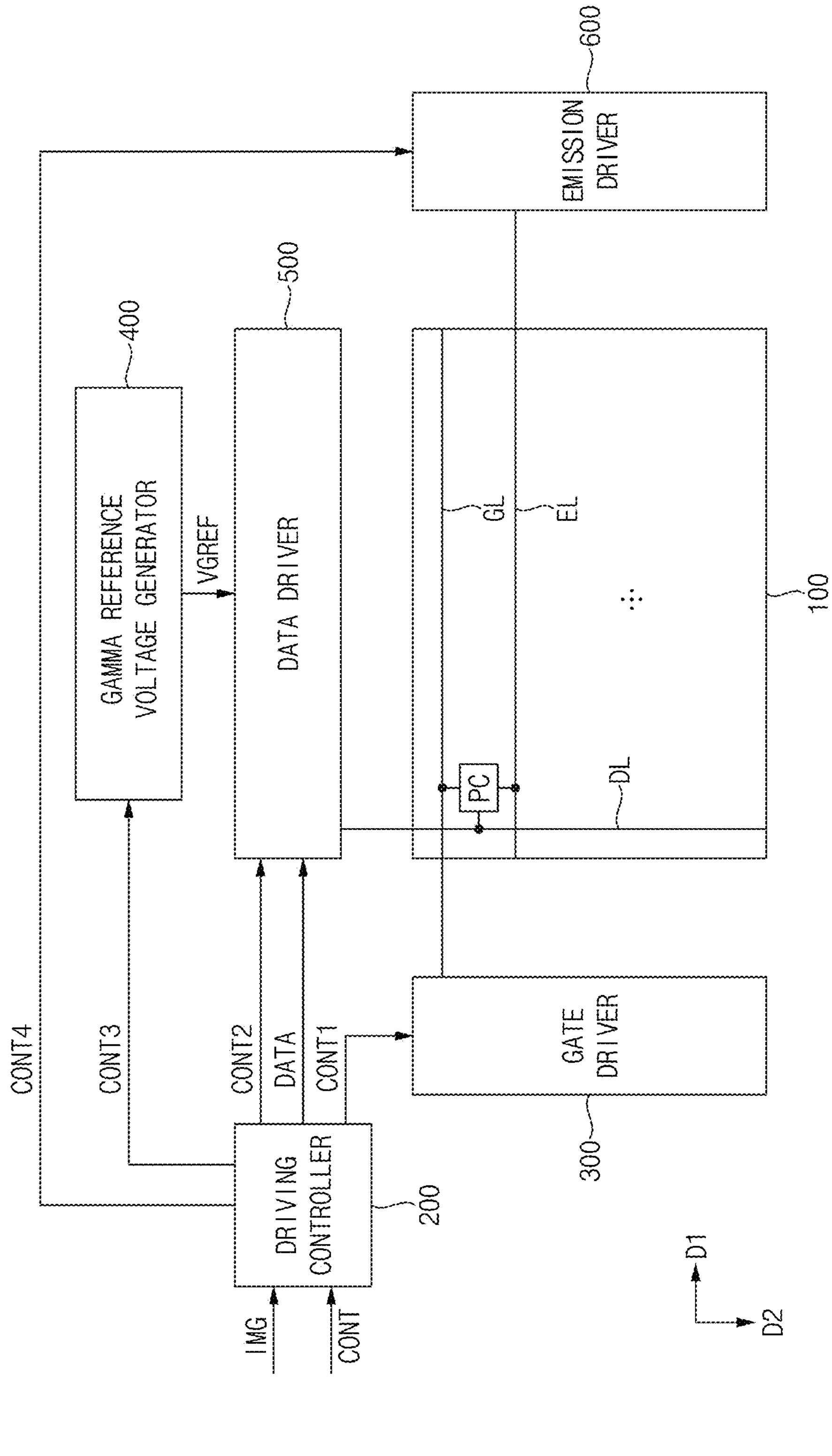
FIG. 1 is a block diagram showing a display device according to embodiments of the present inventive concept.

FIG. 1 is a block diagram showing a display device according to embodiments of the present inventive concept.

Referring to FIG. 1, a display device may include a display panel 100 and a display panel driver. The display panel driver may include a driving controller 200, a gate driver 300, a gamma reference voltage generator 400, and a data driver 500. The display panel driver may further include an emission driver 600.

For example, the driving controller 200 and the data driver 500 may be formed integrally. For example, the driving controller 200, the gamma reference voltage generator 400, and the data driver 500 may be formed integrally. For example, the driving controller 200, the gate driver 300, the gamma reference voltage generator 400, and the data driver 500 may be formed integrally. For example, the driving controller 200, the gate driver 300, the gamma reference voltage generator 400, the data driver 500, and the emission driver 600 may be formed integrally. Meanwhile, a driving module in which at least the driving controller 200 and the data driver 500 are formed integrally may be named a timing controller embedded data driver (TED).

The display panel 100 may include a display area for displaying an image and a peripheral area disposed adjacent to the display area.

For example, in an embodiment, the display panel 100 may be an organic light emitting diode display panel including an organic light emitting diode. For example, the display panel 100 may be a quantum-dot organic light emitting diode display panel including an organic light emitting diode and a quantum-dot color filter. For example, the display panel 100 may be a quantum-dot nano light emitting diode display panel including a nano light emitting diode and a quantum-dot color filter.

The display panel 100 may include gate lines GL, data lines DL, emission lines EML, and pixel circuits PC electrically connected to the gate lines GL, the data lines DL, and the emission lines EML, respectively. The gate lines GL may extend in a first direction D1, the data lines DL may extend in a second direction D2 crossing the first direction D1, and the emission lines EML may extend in the first direction D1.

The driving controller 200 may receive input image data IMG and an input control signal CONT from an external device (not shown). For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral area of the display panel 100. In an embodiment, the gate driver 300 may be mounted on the peripheral area of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be disposed within the driving controller 200 or may be disposed within the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In an embodiment, the emission driver 600 may be integrated in the peripheral area of the display panel 100. In an embodiment, the emission driver 600 may be mounted in the peripheral area of the display panel 100.

In FIG. 1, for a convenience of an explanation, the gate driver 300 may be disposed on a first side of the display panel 100 and the emission driver 600 may be disposed on a second side of the display panel 100. Nevertheless, the present inventive concept is not limited thereto. For example, both the gate driver 300 and the emission driver 600 may be disposed on the first side of the display panel 100. For example, both the gate driver 300 and the emission driver 600 may be disposed on both sides of the display panel 100. For example, the gate driver 300 and the emission driver 600 may be formed integrally.

Figure 2:
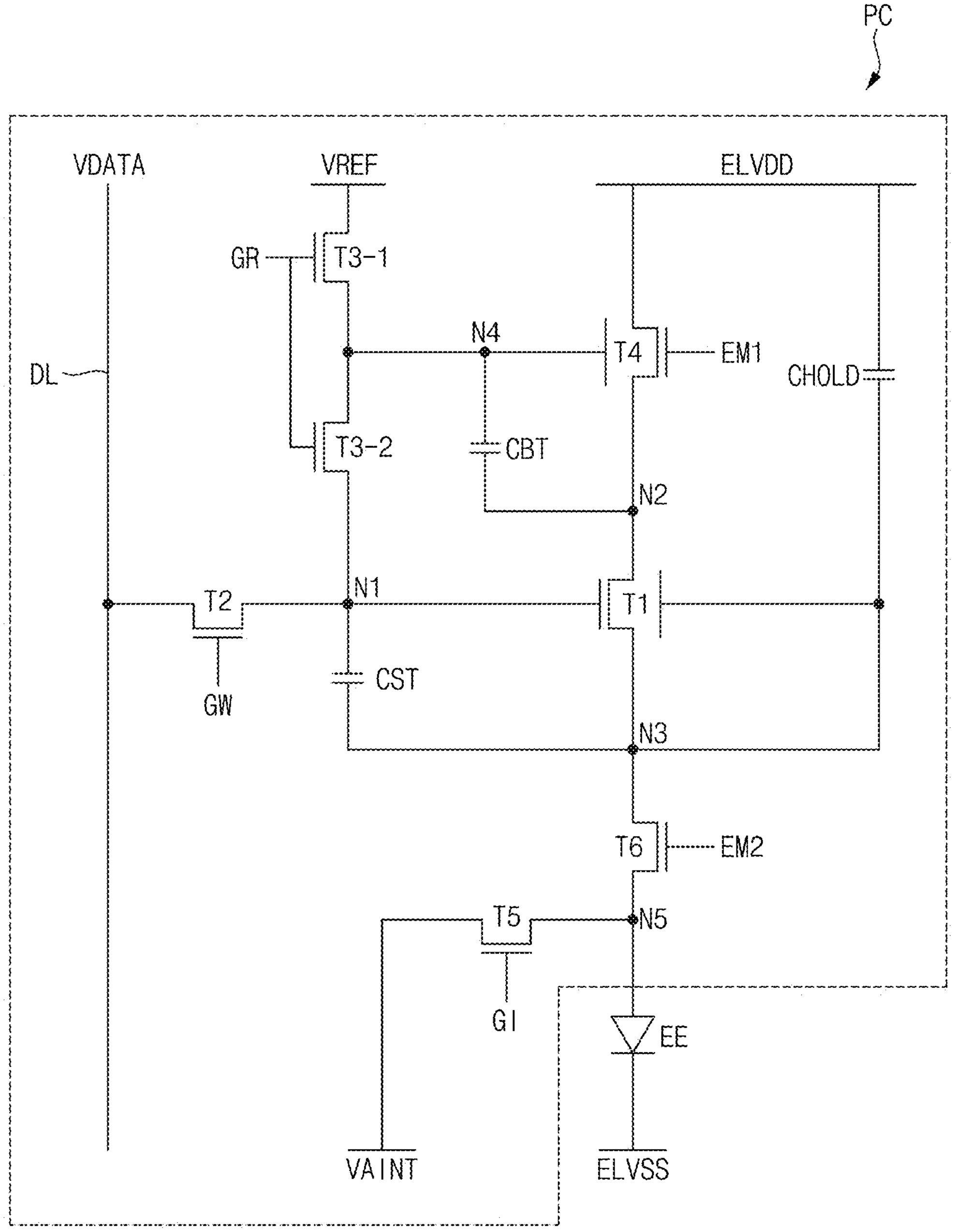
FIG. 2 is a circuit diagram showing an example of a pixel circuit of a display panel of FIG. 1.

FIG. 2 is a circuit diagram showing an example of a pixel circuit PC of a display panel 100 of FIG. 1.

Referring to FIG. 1 and FIG. 2, the pixel circuit PC may include a first transistor T1, a second transistor T2, a third transistor T3-1, T3-2, a fourth transistor T4, a fifth transistor T5, a sixth transistor T6, a boosting capacitor CBT, a storage capacitor CST, a hold capacitor CHOLD. A light emitting element EE is connected to the pixel circuit PC.

In an embodiment, the first transistor T1, the second transistor T2, the third transistor T3-1, T3-2, the fourth transistor T4, the fifth transistor T5, and the sixth transistor T6 may be N-type transistors. For example, the first transistor T1, the second transistor T2, the third transistor T3-1, T3-2, the fourth transistor T4, the fifth transistor T5, and the sixth transistor T6 may be NMOS transistors.

The N-type transistor may be turned on when a gate-source voltage of the N-type transistor is greater than or equal to a threshold voltage of the N-type transistor. On the other hand, the N-type transistor may be turned off when the gate-source voltage of the N-type transistor is less than the threshold voltage of the N-type transistor. For example, when a gate signal having a high level is applied to a gate electrode of the N-type transistor, the N-type transistor may be turned on. For example, when a gate signal having a low level is applied to the gate electrode of the N-type transistor, the N-type transistor may be turned off.

Even if the N-type transistor is turned off, a leakage current (or an off-current) may occur. However, when the N-type transistor is an oxide semiconductor transistor such as the NMOS transistor, an intensity of the leakage current is very small.

The first transistor T1 may include a gate electrode connected to a first node N1, a first electrode connected to a second node N2, a second electrode connected to a third node N3, and a back gate electrode connected to the third node N3. The first transistor T1 may be turned on based on a voltage of the first node N1 and a voltage of the third node N3 to generate a driving current. Specifically, the first transistor T1 may generate the driving current based on a voltage difference between the voltage of the first node N1 and the voltage of the third node N3. Therefore, as the voltage difference between the voltage of the first node N1 and the voltage of the third node N3 is large, an intensity of the driving current may increase. For example, the first transistor T1 may be referred to as a driving transistor.

The second transistor T2 may include a gate electrode receiving a data write gate signal GW, a first electrode connected to a data line DL transmitting a data voltage VDATA, and a second electrode connected to the first node N1. The second transistor T2 may be turned on in response to a data write gate signal GW having the high level to provide the data voltage VDATA to the first node N1. For example, the second transistor T2 may be referred to as a data write transistor.

The third transistors T3-1, T3-2 may include a third-first transistor T3-1 and a third-second transistor T3-2 serially connected.

The third-first transistor T3-1 may include a gate electrode receiving a reset gate signal GR, a first electrode receiving a reference voltage VREF, and a second electrode connected to a fourth node N4. The third-first transistor T3-1 may be turned on in response to a reset gate signal GR having the high level to provide the reference voltage VREF to the fourth node N4.

The third-second transistor T3-2 may include a gate electrode receiving the reset gate signal GR, a first electrode connected to the fourth node N4, and a second electrode connected to the first node N1. The third-second transistor T3-2 may provide a voltage of the fourth node N4 to the first node N1 in response to the reset gate signal having the high level.

For example, the third transistor T3-1, T3-2 may be referred to as a gate initialization transistor.

The fourth transistor T4 may include a gate electrode receiving a first emission signal EM1, a first electrode receiving a first power supply voltage ELVDD, and a second electrode connected to the second node N2. The fourth transistor T4 may be turned on in response to a first emission signal EM1 having the high level to provide the first power supply voltage ELVDD to the second node N2. The fourth transistor T4 may be referred to as a first light emitting control transistor.

The fifth transistor T5 may include a gate electrode receiving an anode initialization gate signal GI, a first electrode receiving an anode initialization voltage VAINT, and a second electrode connected to a fifth node N5. The fifth transistor T5 may be turned on in response to an anode initialization gate signal GI having the high level to provide the anode initialization voltage VAINT to the fifth node N5. The fifth transistor T5 may be referred to as an anode initialization transistor.

The sixth transistor T6 may include a gate electrode receiving a second emission signal EM2, a first electrode connected to the third node N3, and a second electrode connected to the fifth node N5. The sixth transistor T6 may be turned on in response to a second emission signal EM2 having the high level to connect the third node N3 and the fifth node N5. When the sixth transistor T6 is turned on, the sixth transistor T6 may provide a voltage of the fifth node N5 to the third node N3 or the driving current to the light emitting element EE. The sixth transistor T6 may be referred to as a second light emitting control transistor.

The boosting capacitor CBT may include a first electrode connected to the fourth node N4 and a second electrode connected to the second node N2. The boosting capacitor CBT may charge a voltage difference between the second node N2 and the fourth node n4, and may boost the voltage of the second node N2 or the voltage of the fourth node N4 while maintaining the charged voltage in the boosting capacitor CBT.

The storage capacitor CST may include a first electrode connected to the first node N1 and a second electrode connected to the third node N3. The storage capacitor CST may store the data voltage VDATA.

The hold capacitor CHOLD may include a first electrode receiving the first power supply voltage ELVDD and a second electrode connected to the third node N3. The hold capacitor CHOLD may maintain the voltage of the third node N3.

The light emitting element EE may include an anode electrode connected to the fifth node N5 and a cathode electrode receiving a second power supply voltage ELVSS. The light emitting element EE may emit a light in response to the driving current. As the intensity of the driving current is large, a luminance corresponding to a light emitting intensity of the light emitting element EE may increase.

Figure 3:
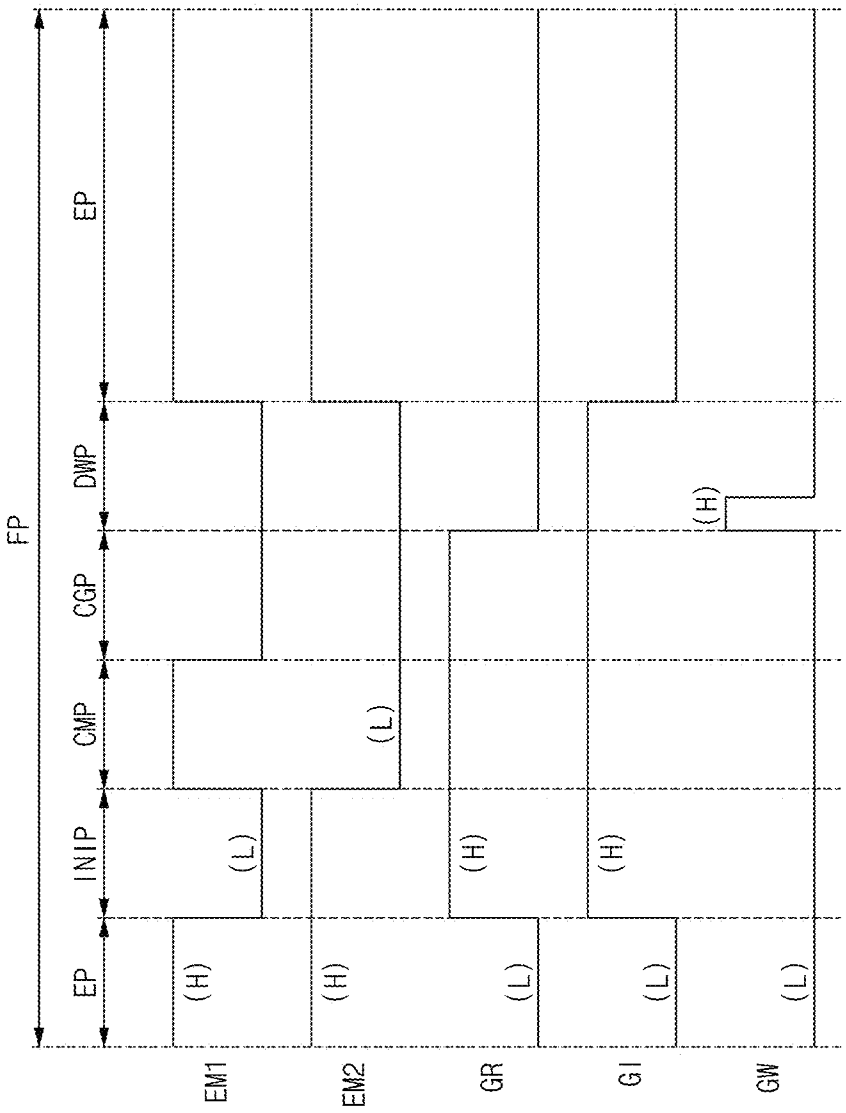
FIG. 3 is a timing diagram showing an example of an operation of a pixel circuit of FIG. 2.

FIG. 3 is a timing diagram showing an example of an operation of a pixel circuit PC of FIG. 2.

Referring to FIGS. 1 to 3, the pixel circuit PC may operate in frame units. A frame period FP of the pixel circuit PC may include an initialization period INIP, a compensation period CMP, a charging period CGP, a data write period DWP, and an emission period EP.

In the initialization period INIP, the first emission signal EM1 may have the low level L, the second emission signal EM2 may have the high level H, the reset gate signal GR may have the high level H, the anode initialization gate signal GI may have the high level H, and the data write gate signal GW may have the low level L.

In the compensation period CMP, the first emission signal EM1 may have the high level H, the second emission signal EM2 may have the low level L, the reset gate signal GR may have the high level H, the anode initialization gate signal GI may have the high level H, and the data write gate signal GW may have the low level L.

In the charging period CGP, the first emission signal EM1 may have the low level L, the second emission signal EM2 may have the low level L, the reset gate signal GR may have the high level H, the anode initialization gate signal GI may have the high level H, and the data write gate signal GW may have the low level L.

In the data write period DWP, the first emission signal EM1 may have the low level L, the second emission signal EM2 may have the low level L, the reset gate signal GR may have the low level L, the anode initialization gate signal GI may have the high level H, and the data write gate signal GW may have the high level H.

In the emission period EP, the first emission signal EM1 may have the high level H, the second emission signal EM2 may have the high level H, the reset gate signal GR may have the low level L, the anode initialization gate signal GI may have the low level L, and the data write gate signal GW may have the low level L.

Figure 4:
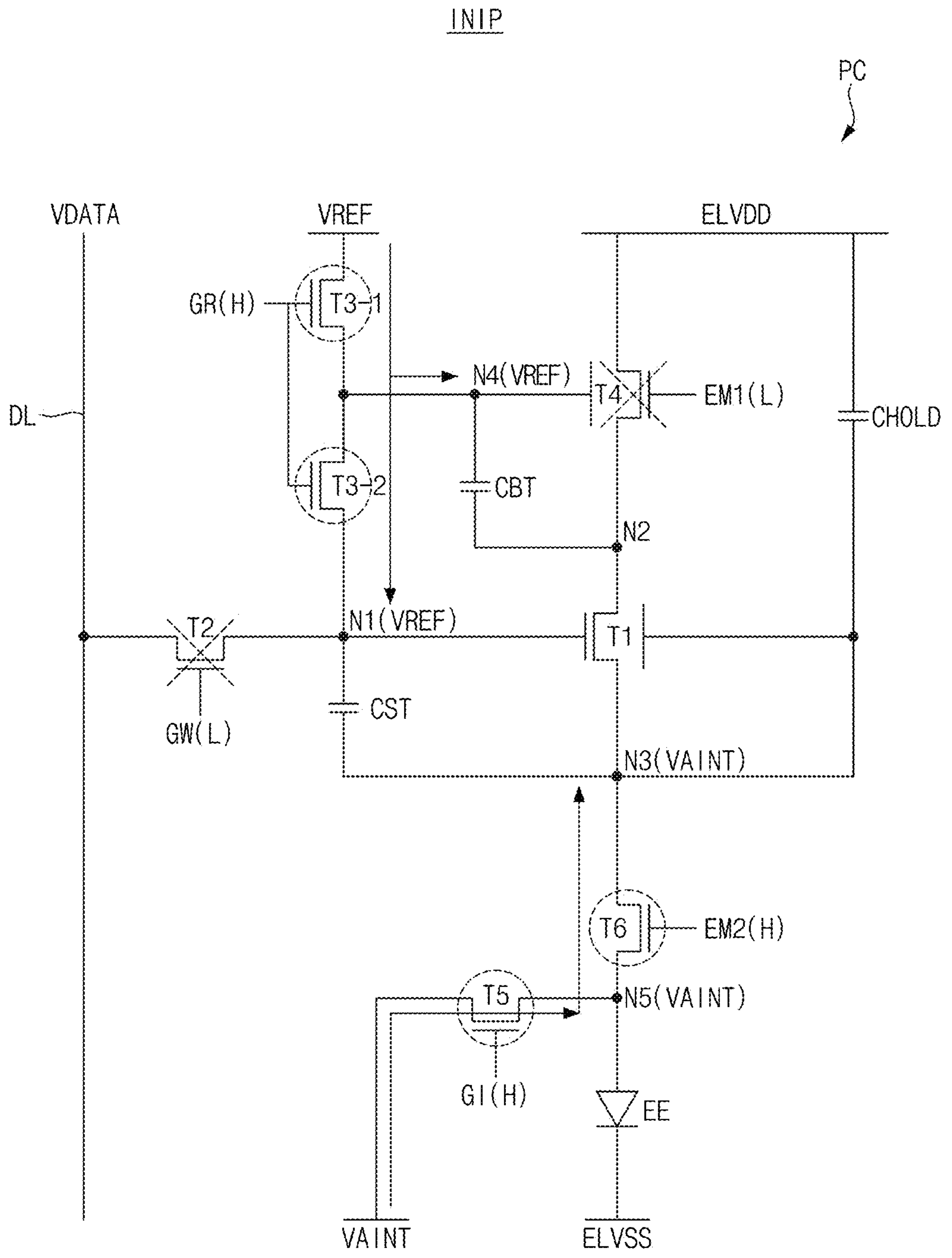
FIG. 4 is a circuit diagram showing an example of an operation of a pixel circuit of FIG. 2 in an initialization period of FIG. 3.

FIG. 4 is a circuit diagram showing an example of an operation of a pixel circuit PC of FIG. 2 in an initialization period INIP of FIG. 3.

Referring to FIGS. 1 to 4, in the initialization period INIP, an initialization operation for the gate electrode of the first transistor T1, an initialization operation for the anode electrode, and an initialization operation for the second electrode of the first transistor T1 may be performed.

In the initialization period INIP, the second transistor T2 may be turned off in response to the data write gate signal GW having the low level L, the third transistor T3-1, T3-2 may be turned on in response to the reset gate signal GR having the high level H, the fourth transistor T4 may be turned off in response to the first emission signal EM1 having the low level L, the fifth transistor T5 may be turned on in response to the anode initialization gate signal GI having the high level H, and the sixth transistor T6 may be turned on in response to the second emission signal EM2 having the high level H.

The third-first transistor T3-1 may be turned on to provide the reference voltage VREF to the fourth node N4. Therefore, the voltage of the fourth node N4 may become the reference voltage VREF.

The third-second transistor T3-2 may be turned on to provide the voltage of the fourth node N4 to the first node N1. Therefore, the voltage of the first node N1 may become the reference voltage VREF.

Accordingly, the gate electrode of the first transistor T1 may be initialized to the reference voltage VREF.

The fifth transistor T5 may be turned on to provide the anode initialization voltage VAINT to the fifth node N5. Therefore, the voltage of the fifth node N5 may become the anode initialization voltage VAINT.

Accordingly, the anode electrode may be initialized with the anode initialization voltage VAINT.

The sixth transistor T6 may be turned on to provide the voltage of the fifth node N5 to the third node N3. Therefore, the voltage of the third node N3 may become the anode initialization voltage VAINT.

Accordingly, the second electrode of the first transistor T1 may be initialized with the anode initialization voltage VAINT.

As such, in the initialization period INIP, the initialization operation for the gate electrode of the first transistor T1, the initialization operation for the anode electrode, and the initialization operation for the second electrode of the first transistor T1 may be performed.

Figure 5:
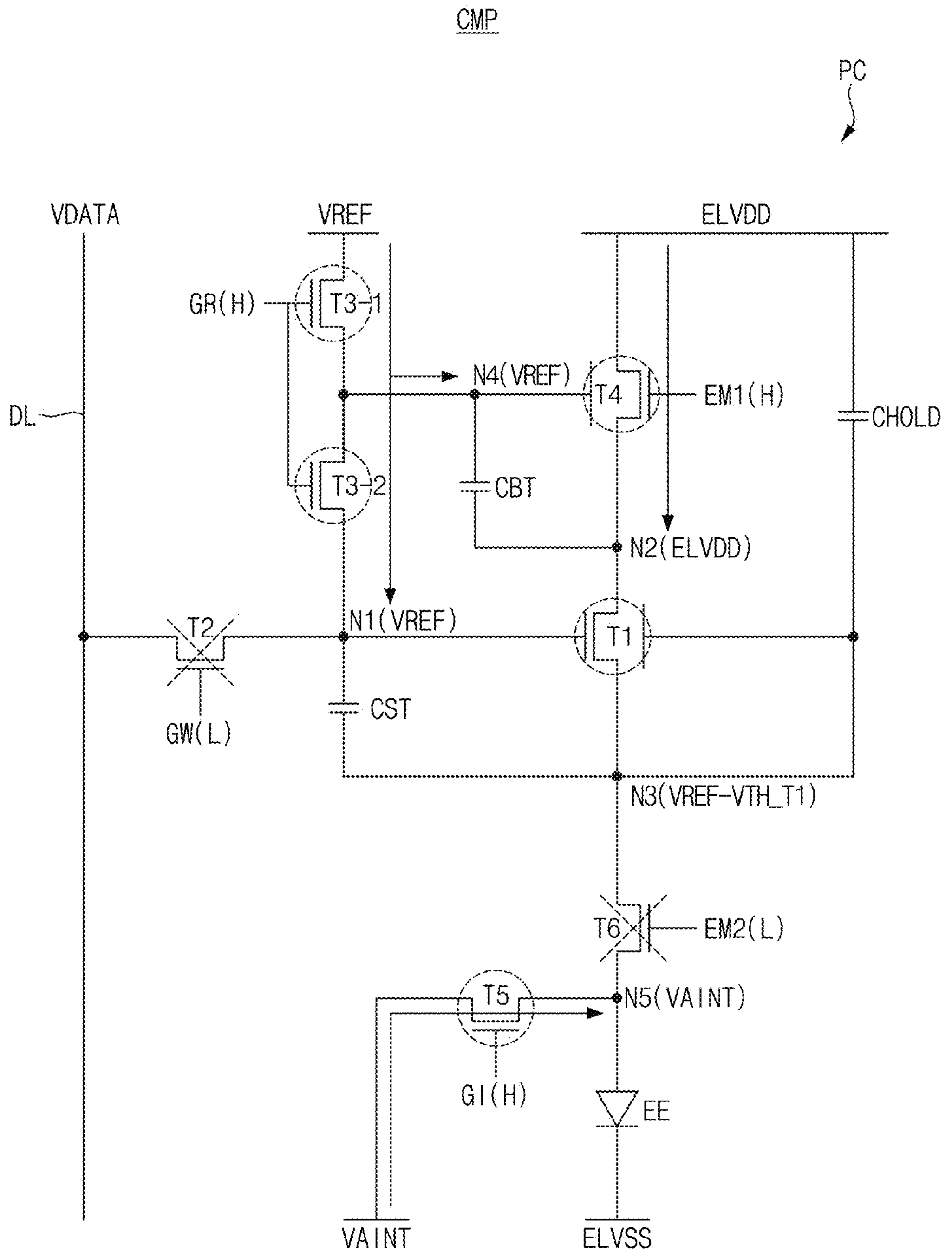
FIG. 5 is a circuit diagram showing an example of an operation of a pixel circuit of FIG. 2 in a compensation period of FIG. 3.

FIG. 5 is a circuit diagram showing an example of an operation of a pixel circuit PC of FIG. 2 in a compensation period CMP of FIG. 3.

Referring to FIGS. 1 to 5, in the compensation period CMP, a compensation operation for a threshold voltage VTH_T1 of the first transistor T1 may be performed.

In the compensation period CMP, the second transistor T2 may be turned off in response to the data write gate signal GW having the low level L, the third transistor T3-1, T3-2 may be turned on in response to the reset gate signal GR having the high level H, the fourth transistor T4 may be turned on in response to the first emission signal EM1 having the high level H, the fifth transistor T5 may be turned on in response to the anode initialization gate signal GI having the high level H, and the sixth transistor T6 may be turned off in response to the second emission signal EM2 having the low level L.

The third-first transistor T3-1 may be turned on to provide the reference voltage VREF to the fourth node N4. Therefore, the voltage of the fourth node N4 may become the reference voltage VREF.

The third-second transistor T3-2 may be turned on to provide the voltage of the fourth node N4 to the first node N1. Therefore, the voltage of the first node N1 may become the reference voltage VREF.

The fourth transistor T4 may be turned on to provide the first power supply voltage ELVDD to the second node N2. Therefore, the voltage of the second node N2 may become the first power supply voltage ELVDD.

The first transistor T1 may be turned on in response to the voltage of the first node N1 and the voltage of the third node N3, and the first transistor T1 may be turned on until the voltage of the third node N3 becomes a voltage (VREF−VTH_T1) in which the threshold voltage VTH_T1 of the first transistor T1 is subtracted from the reference voltage VREF.

Accordingly, since the voltage of the first node N1 is the reference voltage VREF and the voltage of the third node N3 is a voltage (VREF−VTH_T1) in which the threshold voltage VTH_T1 of the first transistor T1 is subtracted from the reference voltage VREF, the storage capacitor CST may store the threshold voltage VTH_T1 of the first transistor T1 corresponding to a voltage difference between the first node N1 and the third node N3.

The fifth transistor T5 may be turned on to provide the anode initialization voltage VAINT to the fifth node N5. Therefore, the voltage of the fifth node N5 may be the anode initialization voltage VAINT.

As such, in the compensation period CMP, the compensation operation for the threshold voltage VTH_T1 of the first transistor T1 may be performed.

Figure 6:
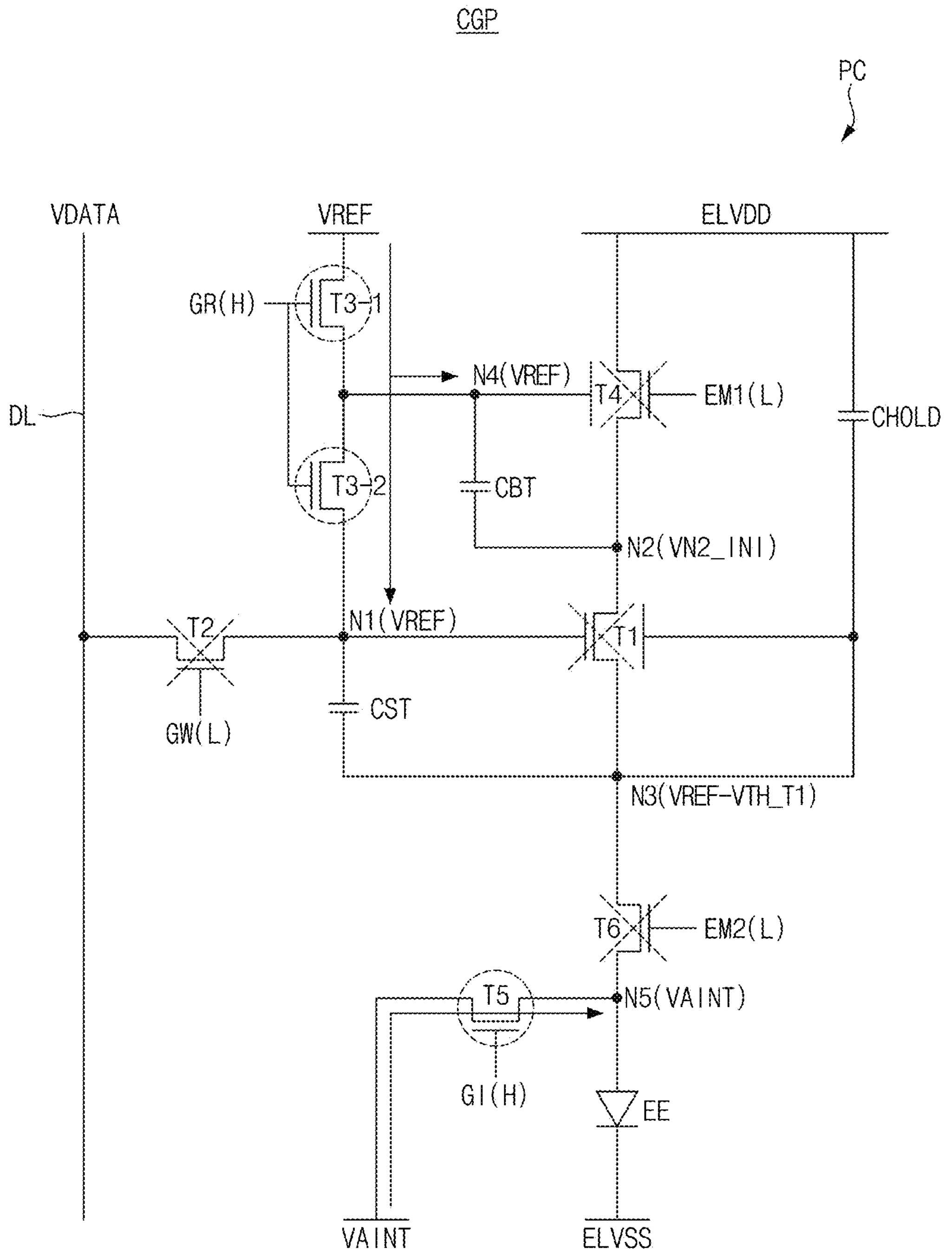
FIG. 6 is a circuit diagram showing an example of an operation of a pixel circuit of FIG. 2 in a charging period of FIG. 3.

FIG. 6 is a circuit diagram showing an example of an operation of a pixel circuit PC of FIG. 2 in a charging period CGP of FIG. 3.

Referring to FIGS. 1 to 6, in the charging period CGP, a charging operation for the boosting capacitor CBT may be performed.

In the charging period CGP, the second transistor T2 may be turned off in response to the data write gate signal GW having the low level L, the third transistor T3-1, T3-2 may be turned on in response to the reset gate signal GR having the high level H, the fourth transistor T4 may be turned off in response to the first emission signal EM1 having the low level L, the fifth transistor T5 may be turned on in response to the anode initialization gate signal GI having the high level H, and the sixth transistor T6 may be turned off in response to the second emission signal EM2 having the low level L.

The first transistor T1 may be turned off after the voltage of the third node N3 becomes the voltage (VREF−VTH_T1) in which the threshold voltage VTH_T1 of the first transistor T1 is subtracted from the reference voltage VREF. In this case, when the fourth transistor T4 is turned off, the first power supply voltage ELVDD may no longer be provided to the second node N2, and the voltage of the second node N2 may begin to decrease and become an initial voltage VN2_INI of the second node N2. For example, the initial voltage VN2_INI of the second node N2 may be a ground voltage.

The third-first transistor T3-1 may be turned on to provide the reference voltage VREF to the fourth node N4. Therefore, the voltage of the fourth node N4 may be the reference voltage VREF.

The third-second transistor T3-2 may be turned on to provide the voltage of the fourth node N4 to the first node N1. Therefore, the voltage of the first node N1 may become the reference voltage VREF.

Accordingly, since the voltage of the fourth node N4 is the reference voltage VREF and the voltage of the second node N2 is the initial voltage VN2_INI of the second node N2, the boosting capacitor CBT may charge a voltage (VREF−VN2_INI) in which the initial voltage VN2_INI of the second node N2 is subtracted from the reference voltage VREF corresponding to the voltage difference between the second node N2 and the fourth node N4.

The fifth transistor T5 may be turned on to provide the anode initialization voltage VAINT to the fifth node N5. Therefore, the voltage of the fifth node N5 may become the anode initialization voltage VAINT.

As such, in the charging period CGP, the charging operation for the boosting capacitor CBT may be performed.

Figure 7:
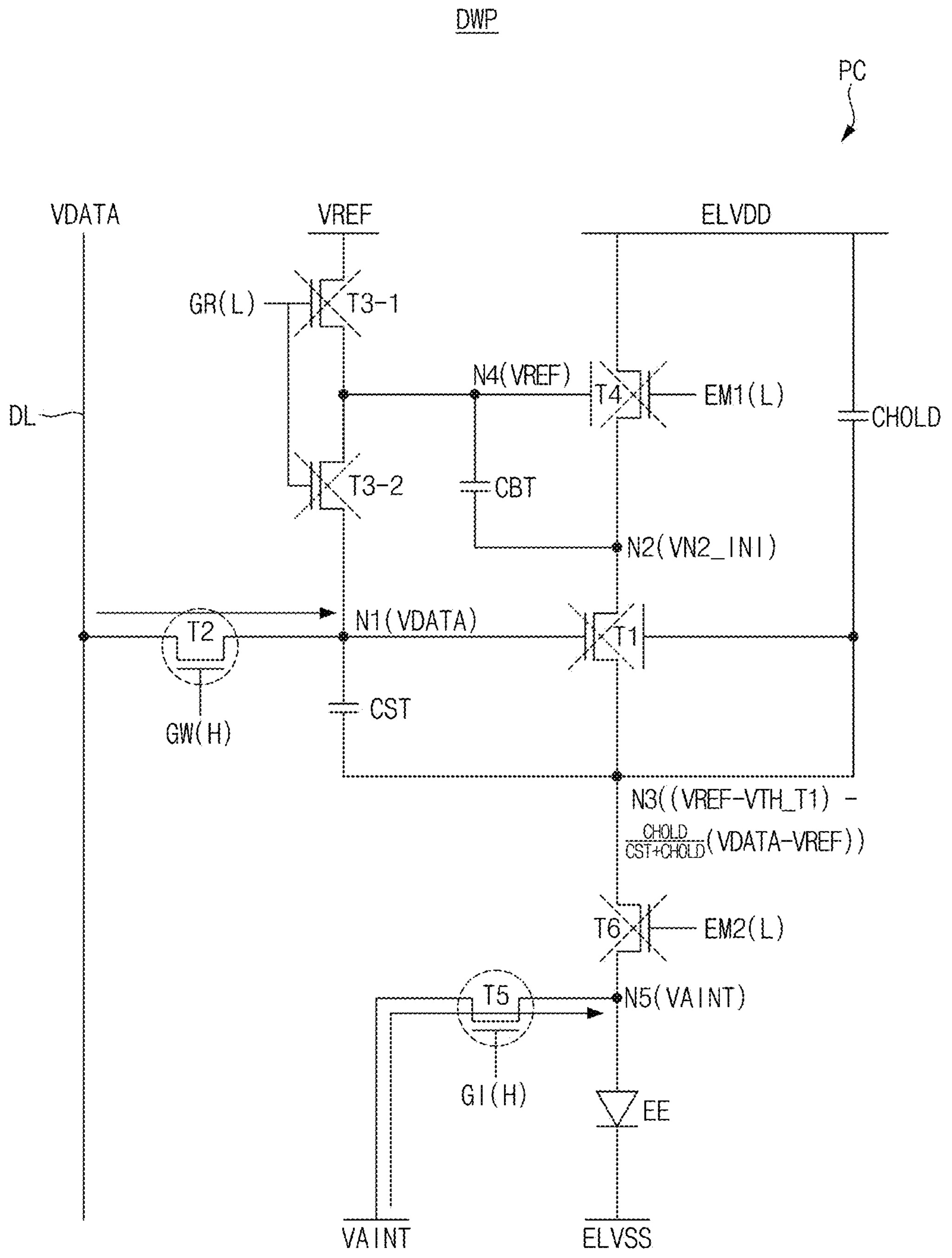
FIG. 7 is a circuit diagram showing an example of an operation of a pixel circuit of FIG. 2 in a data write period of FIG. 3.

FIG. 7 is a circuit diagram showing an example of an operation of a pixel circuit PC of FIG. 2 in a data write period DWP of FIG. 3.

Referring to FIGS. 1 to 7, in the data write period DWP, a data write operation for the pixel circuit PC may be performed.

In the data write period DWP, the second transistor T2 may be turned on in response to the data write gate signal GW having the high level H, the third transistor T3-1, T3-2 may be turned off in response to the reset gate signal GR having the low level L, the fourth transistor T4 may be turned off in response to the first emission signal EM1 having the low level L, the fifth transistor T5 may be turned on in response to the anode initialization gate signal GI having the high level H, and the sixth transistor T6 may be turned off in response to the second emission signal EM2 having the low level L.

The second transistor T2 may be turned on to provide the data voltage VDATA to the first node N1. Therefore, the voltage of the first node N1 may become the data voltage VDATA.

Accordingly, the voltage of the first node N1 may be changed from the reference voltage VREF to the data voltage VDATA by a voltage difference (VDATA−VREF) between the reference voltage VREF and the data voltage VDATA.

The storage capacitor CST may be connected in series with the hold capacitor CHOLD at the third node N3. The first transistor T1 may be turned off. The sixth transistor T6 may be turned off. Therefore, when the voltage of the first node N1 is changed by "VDATA−VREF", the voltage of the third node N3 may be changed by "CHOLD/(CST+CHOLD)×(VDATA−VREF)". Therefore, the voltage of the third node N3 may be "VREF−VTH_T1−CHOLD/(CST+CHOLD)×(VDATA−VREF)".

Accordingly, the storage capacitor CST may store a component of the data voltage VDATA.

As such, in the data write period DWP, the data write operation for the pixel circuit PC may be performed.

Figure 8:
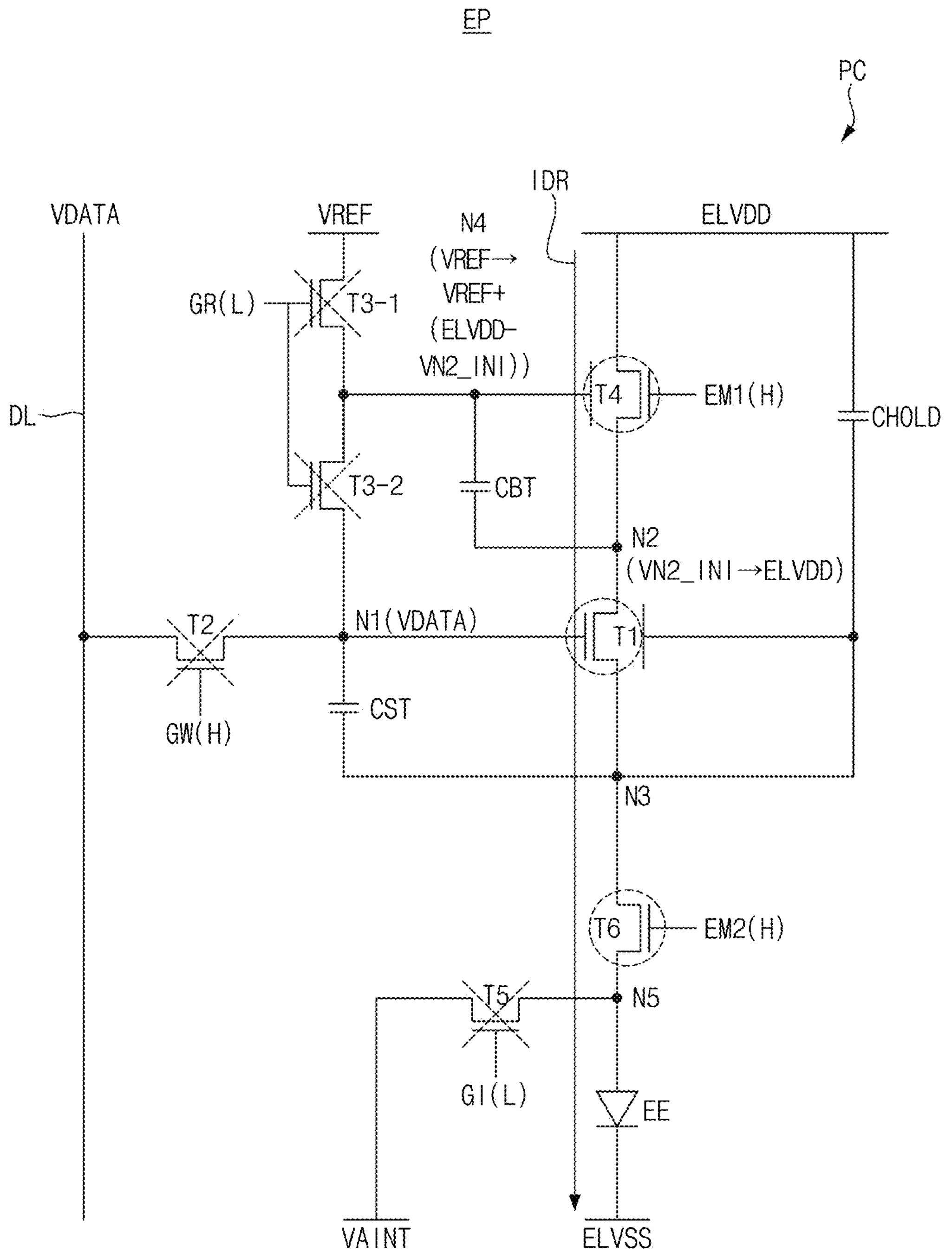
FIG. 8 is a circuit diagram showing an example of an operation of a pixel circuit of FIG. 2 in a emission period of FIG. 3.

FIG. 8 is a circuit diagram showing an example of an operation of a pixel circuit PC of FIG. 2 in an emission period EP of FIG. 3.

Referring to FIGS. 1 to 8, in the emission period EP, a light emitting operation for the pixel circuit PC may be performed.

In the emission period EP, the second transistor T2 may be turned off in response to the data write gate signal GW having the low level L, the third transistor T3-1, T3-2 may be turned off in response to the reset gate signal GR having the low level L, the fourth transistor T4 may be turned on in response to the first emission signal EM1 having the high level H, the fifth transistor T5 may be turned off in response to the anode initialization gate signal GI having the low level L, and the sixth transistor T6 may be turned on in response to the second emission signal EM2 having the high level H.

The fourth transistor T4 may be turned on to provide the first power supply voltage ELVDD to the second node N2. Therefore, the voltage of the second node N2 may be changed from the initial voltage VN2_INI of the second node N2 to the first power supply voltage ELVDD by a voltage difference (ELVDD−VN2_INI) between the initial voltage VN2_INI of the second node N2 and the first power supply voltage ELVDD.

The third transistor T3-1, T3-2 may be turned off. Therefore, when the voltage of the first node N1 is changed by "ELVDD−VN2_INI", the voltage of the fourth node N4 may also be changed by "ELVDD−VN2_INI". Therefore, the voltage of the fourth node N4 may be changed from the reference voltage VREF to "VREF+ELVDD−VN2_INI". Here, the boosting capacitor CBT may maintain the voltage difference (VREF−VN2_INI) between the reference voltage VREF corresponding to the voltage charged in the charging period CGP and the initial voltage VN2_INI of the second node N2.

The first transistor T1 may be turned on based on the voltage of the first node N1 and the voltage of the third node N3 to generate the driving current IDR. Specifically, the first transistor T1 may generate the driving current IDR based on the voltage difference between the voltage of the first node N1 and the voltage of the third node N3. Since the voltage difference between the voltage of the first node N1 and the voltage of the third node N3 includes the component of the data voltage VDATA, as the data voltage VDATA is large, the intensity of the driving current IDR may be large.

In addition, since not only the first transistor T1 but also the fourth transistor T4 and the sixth transistor T6 are turned on, a transmission line of the driving current IDR may be formed between a line transmitting the first power supply voltage ELVDD and a line transmitting the second power supply voltage ELVSS.

Accordingly, the driving current IDR may be transmitted to the light emitting element EE along the transmission line of the driving current IDR. The light emitting element EE may emit light in response to the driving current IDR. As the intensity of the driving current IDR is large, the luminance corresponding to the light emitting intensity of the light emitting element EE may be large. That is, as the data voltage VDATA is large, the luminance may be large.

As such, in the emission period EP, a light emitting operation for the pixel circuit PC may be performed.

Figure 9:
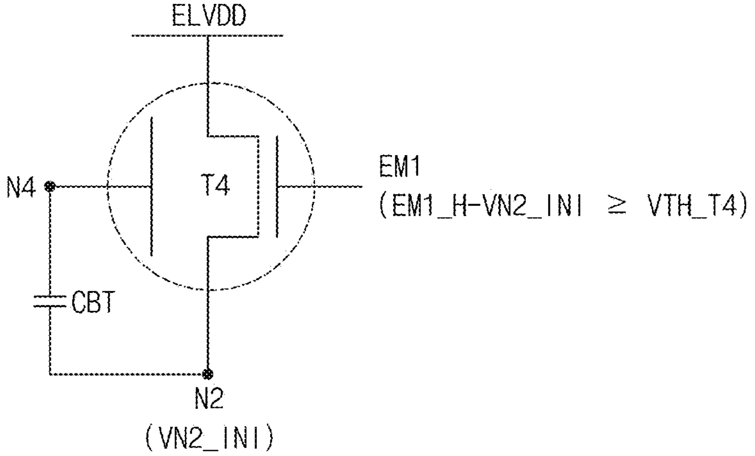
FIGS. 9, 10 and 11 are diagrams specifically explaining an operation of a fourth transistor of FIG. 2.
Figure 10:
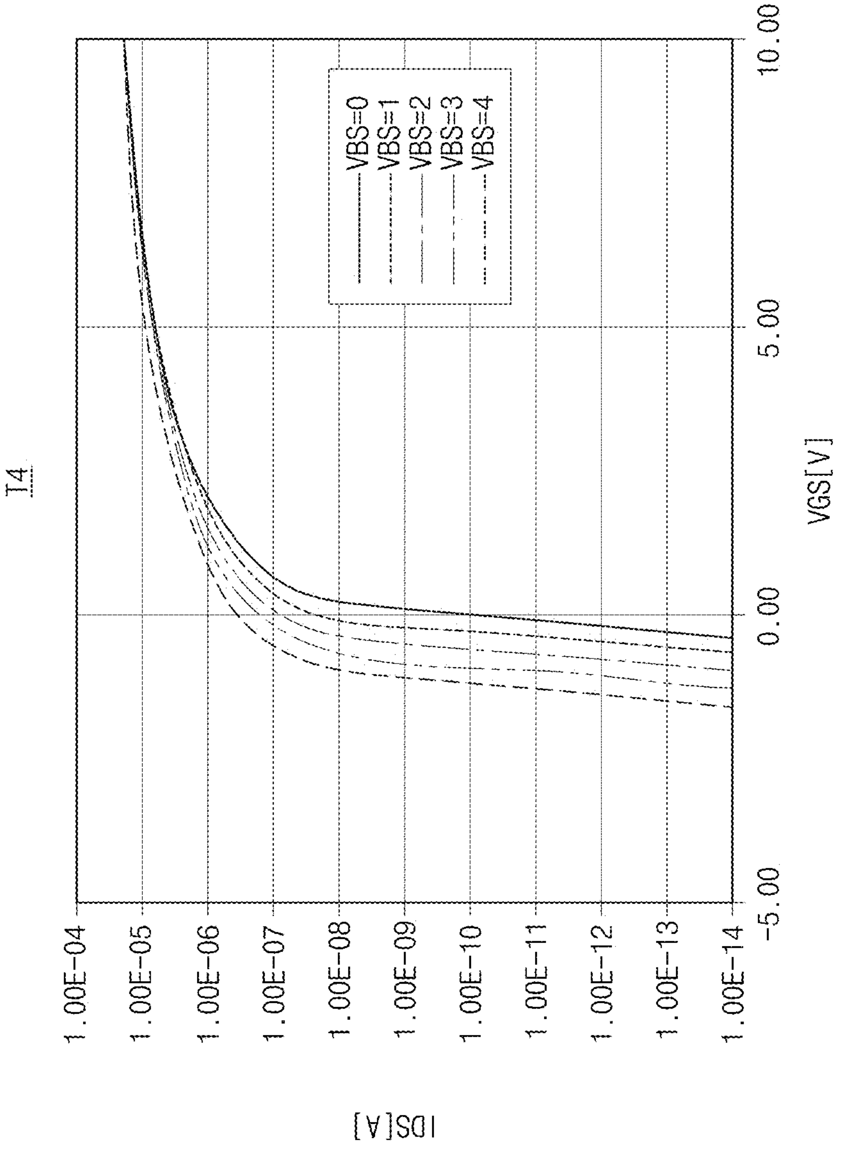
Figure 11:
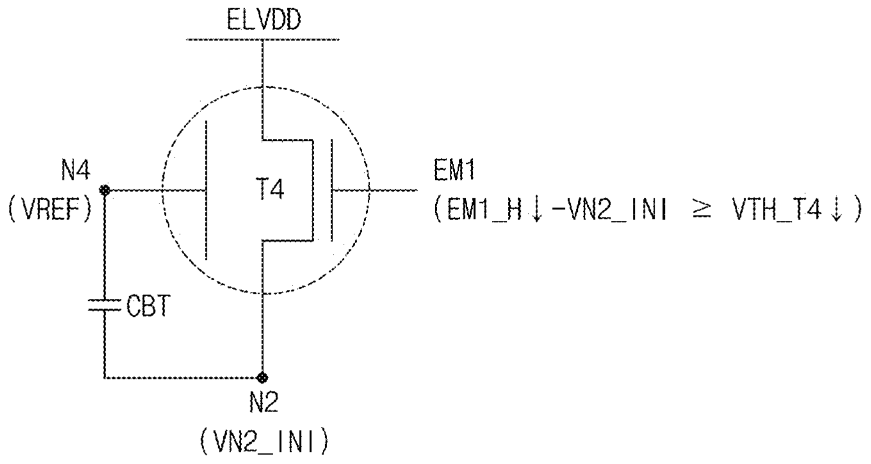

FIGS. 9 to 11 are diagrams specifically explaining an operation of a fourth transistor T4 of FIG. 2.

Referring to FIGS. 1 to 11, the fourth transistor T4 may be turned on in response to the first emission signal EM1 having the high level EM1_H. Specifically, the fourth transistor T4 may be turned on based on a voltage difference between the high level EM1_H of the first emission signal EM1 and the voltage of the second node N2. For example, when the voltage difference between the high level EM1_H of the first emission signal EM1 and the voltage of the second node N2 is greater than or equal to a threshold voltage VTH_T4 of the fourth transistor T4, the fourth transistor T4 may be turned on.

A fact that the fourth transistor T4 is turned on based on the voltage difference between the high level EM1_H of the first emission signal EM1 and the voltage of the second node N2 means that when the first emission signal EM1 having the high level EM1_H is applied to the gate electrode of the fourth transistor T4, a channel through which electrons (or holes) may move is formed between the first electrode of the fourth transistor T4 and the second electrode of the fourth transistor T4. Here, a gate-source voltage of the fourth transistor T4 at which the channel of the fourth transistor T4 starts to be formed corresponds to the threshold voltage VTH_T4 of the fourth transistor T4.

In addition, the fourth transistor T4 may further include the back gate electrode connected to the fourth node N4. In this case, when a voltage greater than the voltage of the second node N2 is applied to the back gate electrode of the fourth transistor T4, another channel through which the electrons (or the holes) may move may be additionally formed between the first electrode of the fourth transistor T4 and the second electrode of the fourth transistor T4. When the another channel of the fourth transistor T4 is additionally formed, the movement of the electrons or holes may become easier, and the threshold voltage VTH_T4 of the fourth transistor T4 may decrease.

Referring to FIG. 9, in the charging period CGP, the voltage of the second node N2 may be the initial voltage VN2_INI of the second node N2. Therefore, when a voltage difference (EM1_H−VN2_INI) between the high level EM1_H of the first emission signal EM1 and the initial voltage VN2_INI of the second node N2 is greater than or equal to the threshold voltage VTH_T4 of the fourth transistor T4, the fourth transistor T4 may be turned on.

Referring to FIG. 10, as a back gate-source voltage VBS of the fourth transistor T4 increase, the gate-source voltage VGS of the fourth transistor T4 required to form a channel may decrease. The threshold voltage VTH_T4 of the fourth transistor T4 may correspond to the gate-source voltage VGS of the fourth transistor T4 at which a drain-source current IDS of the fourth transistor T4 starts to be generated.

Referring to FIG. 11, the reference voltage VREF may be applied to the fourth node N4, and the reference voltage VREF may be greater than the initial voltage VN2_INI of the second node N2. Therefore, the back gate-source voltage VBS of the fourth transistor T4 may have a positive value, and the threshold voltage VTH_T4 of the fourth transistor T4 may decrease. In this case, the high level EM1_H of the first emission signal EM1 which turns on the fourth transistor T4 may decrease. Meanwhile, the boosting capacitor CBT may charge the back gate-source voltage VBS of the fourth transistor T4 having the positive value.

In the emission period EP, a voltage drop may occur due to an internal resistance of the fourth transistor T4. Accordingly, the voltage of the second node N2 may, unlike what is described in FIG. 8, actually be a voltage less than the first power supply voltage ELVDD, not the first power supply voltage ELVDD. In this case, as the high level EM1_H of the first emission signal EM1 is large, a power consumption of the display panel 100 may increase according to a mathematical formula $P=C\times V^2\times f$ (here, P is a power consumption, C is a capacitance of a capacitor, V is a voltage difference, and f is a switching frequency of a voltage).

The pixel circuit PC may include the boosting capacitor CBT, and the boosting capacitor CBT may charge the back gate-source voltage VBS of the fourth transistor T4 having the positive value in the charging period CGP, and may maintain the charged back gate-source voltage VBS of the fourth transistor T4 in the emission period EP. Therefore, the threshold voltage VTH_T4 of the fourth transistor T4 may decrease, the high level EM1_H of the first emission signal EM1 may be lowered, and the power consumption of the display panel 100 may decrease.

Here, the fourth transistor T4 may be the NMOS transistor. The NMOS transistor may have a small off-current. Therefore, even if the threshold voltage VTH_T4 of the fourth transistor T4 decreases, a problem may not occur in an operation of the pixel circuit PC.

As such, the pixel circuit PC may include the fourth transistor T4 and the boosting capacitor CBT. The fourth transistor T4 may include the gate electrode receiving the first emission signal EM1, the first electrode receiving the first power supply voltage ELVDD, the second electrode connected to the second node N2, and the back gate electrode connected to the fourth node N4. The boosting capacitor CBT may include the first electrode connected to the fourth node N4 and the second electrode connected to the second node N2. The reference voltage VREF applied to the fourth node N4 may be greater than the initial voltage VN2_INI of the second node N2. Accordingly, the threshold voltage VTH_T4 of the fourth transistor T4 may decrease, the high level EM1_H of the first emission signal EM1 may be lowered, and the power consumption of the display panel 100 may decrease.

Figure 12:
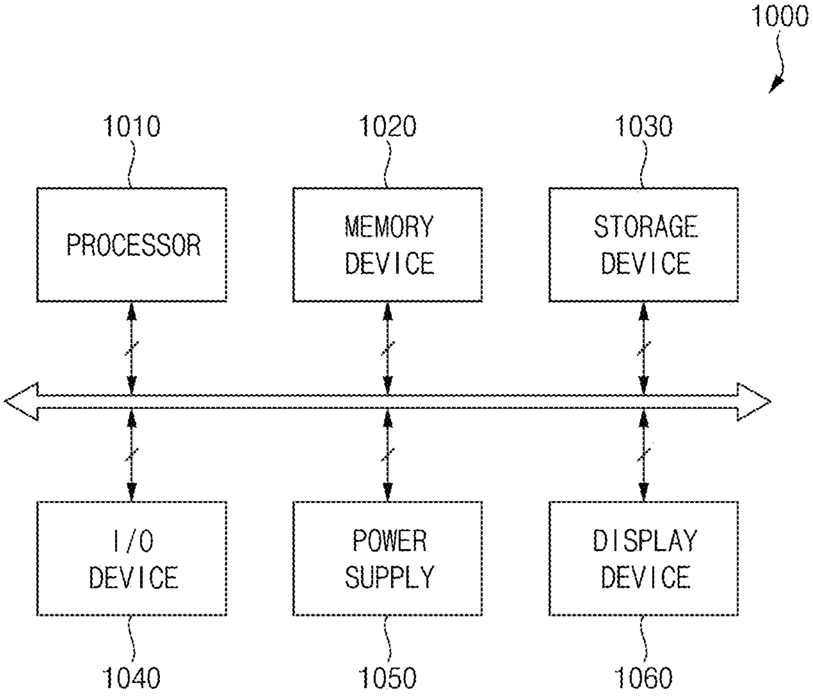
FIG. 12 is a block diagram showing an electronic device according to an embodiment of the present inventive concept.
Figure 13:
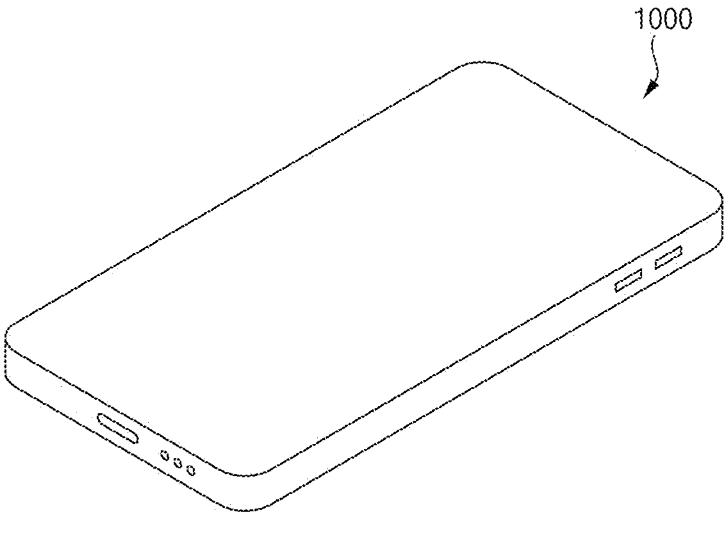
FIG. 13 is a diagram showing an example in which an electronic device of FIG. 12 is implemented as a smart phone.

FIG. 12 is a block diagram showing an electronic device 1000 according to an embodiment of the present inventive concept. FIG. 13 is a diagram showing an example in which an electronic device 1000 of FIG. 12 is implemented as a smart phone.

Referring to FIGS. 1 to 13, the electronic device 1000 may include a processor 1010, a memory device 1020, a storage device 1030, an input/output (I/O) device 1040, a power supply 1050 and a display device 1060. Here, the display device 1060 may be the display device of FIG. 1. In addition, the electronic device 1000 may further include a plurality of ports for communicating with a video card, a sound card, a memory card, a universal serial bus (USB) device, other electronic devices, etc.

In an embodiment, as shown in FIG. 13, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM)

device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display device 1060 may be included in the I/O device 1040. The power supply 1050 may provide power for operations of the electronic device 1000. The display device 1060 may be coupled to other components via the buses or other communication links.

Figure 14:
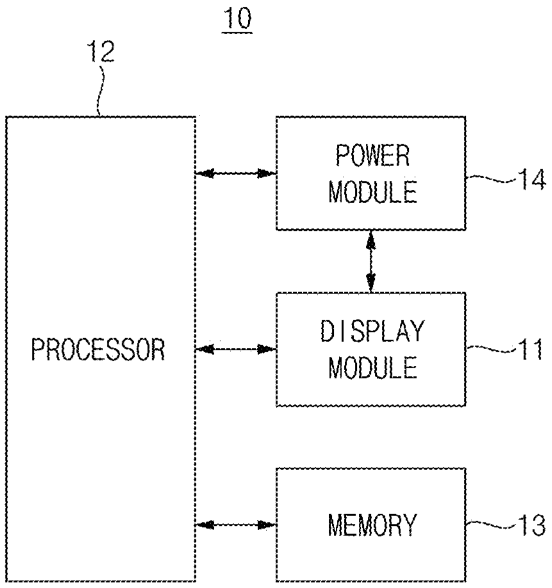
FIG. 14 is a block diagram showing an electronic device according to an embodiment of the present inventive concept.
Figure 15:
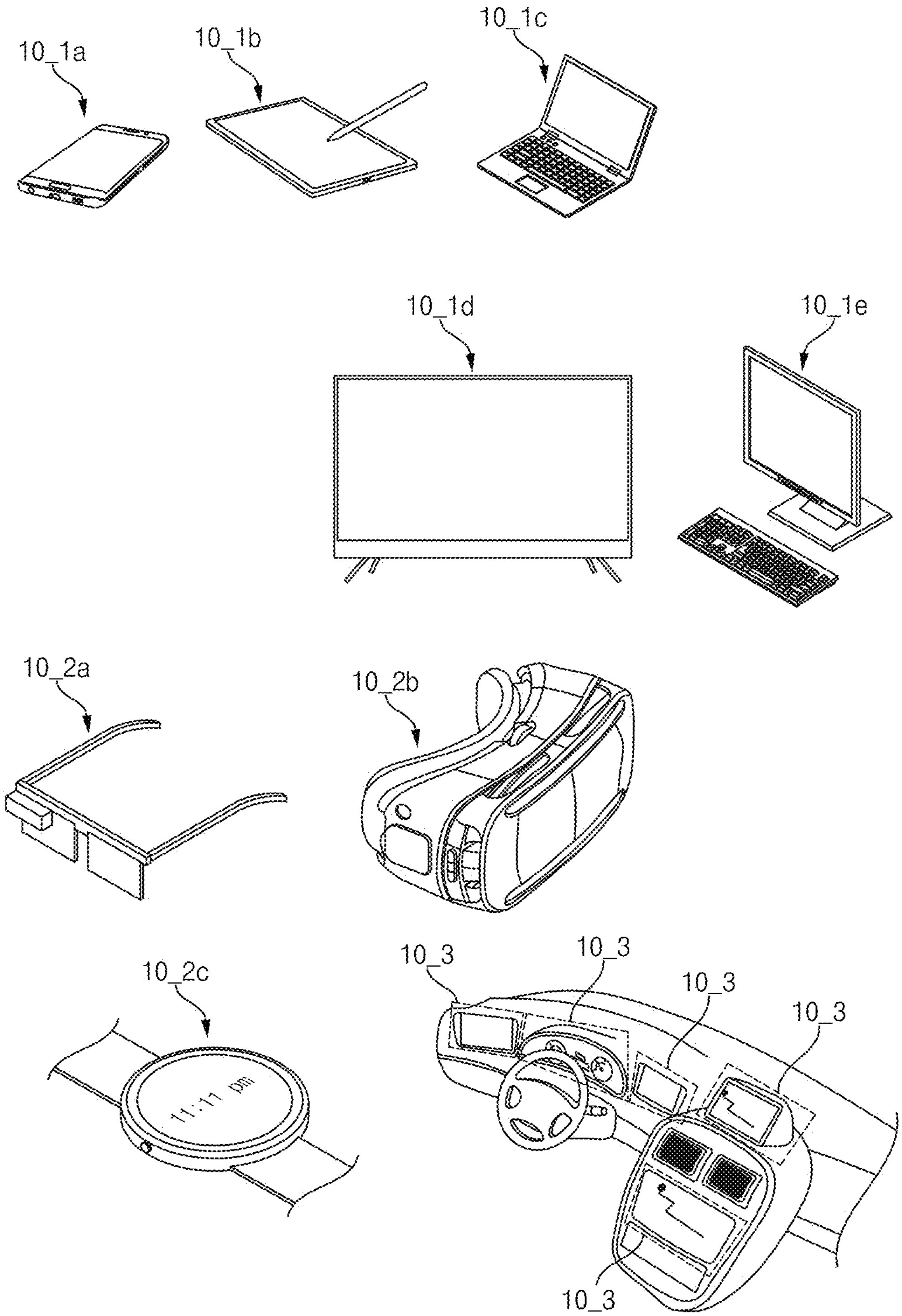
FIG. 15 is schematic diagrams showing the electronic devices of FIG. 14.

FIG. 14 is a block diagram showing an electronic device 10 according to an embodiment of the present inventive concept. FIG. 15 is schematic diagrams showing the electronic devices of FIG. 14.

Referring to FIG. 14, the electronic device 10 according to an embodiment may include a display module 11, a processor 12, a memory 13 and a power module 14.

The display device according to the embodiment of the present inventive concept may be applied to various electronic devices.

In an embodiment, the electronic device 10 may include the display device of FIG. 1. An operation of the display device included in the electronic device 10 may be the same as the operation of the display device explained referring to FIGS. 1 to 11. The electronic device 10 may further include a module or an device having additional functions in addition to the display device.

The processor 12 may include at least one of a central processing unit (CPU), an application processor (AP), a graphic processing unit (GPU), a communication processor (CP), an image signal processor (ISP) and a controller.

In an embodiment, the processor 12 may provide the input control signal CONT of FIG. 1 and the input image data IMG of FIG. 1 to the driving controller 200 included in the display device of FIG. 1.

In an embodiment, the processor 12 may be divided into two or more in a functional or structural perspective. For example, the processor 12 may include a main processor, which is a first driving chip type, including the central processing unit and an auxiliary processor, which is a second driving chip type, including a controller receiving an image signal from the main processor and processing the image signal to match interface specifications of the display module 11. For example, the auxiliary processor may include the driving controller 200 included in the display device of FIG. 1. Thus, the main processor may provide the input control signal CONT of the FIG. 1 and the input image data IMG of FIG. 1 to the auxiliary processor. The auxiliary processor may process the image signal based on the input control signal CONT and the input image data IMG.

The memory 13 may include at least one of a nonvolatile memory and a volatile memory. Data information required for the operation of the processor 12 or the display module 11 may be stored in the memory 13. When the processor 12 executes an application stored in the memory 13, the input control signal CONT and/or the input image data IMG may be transmitted to the display module 11 and the display module 11 may process the input control signal CONT and/or the input image data IMG and may output image information through a display area.

The power module 14 may include a power supply module, such as a power adapter or a battery device, and a power conversion module converting power supplied by the power supply module to generate a power required for the operation of the electronic device 10.

At least one of the elements of the electronic device 10 may be included in the display device according to embodiments of the present inventive concept. In addition, a part of a single functional module may be included in the display device and another part of the single functional module may be disposed out of the display device. For example, the display module 11 may be included in the display device but the processor 12, the memory 13 and the power module 14 may be included in another device in the electronic device 10 which is not the display device.

Referring to FIG. 15, the various electronic devices including the display device according to the present embodiments may include electronic devices for displaying image such as a smartphone 10_1*a*, a tablet PC 10_1*b*, a laptop 10_1*c*, a television 10_1*d*, a desktop monitor 10_1*e*, wearable electronic devices including a display module such as smart glasses 10_2*a*, a head mounted display 10_2*b* and a smart watch 10_2*c* and vehicle electronic devices 10_3 including display modules such as a CID (center information display), a room mirror display disposed on an instrument panel, center fascia, and a dashboard of a vehicle. The electronic device 10 may not be limited to the electronic devices for displaying image, the wearable electronic devices and the vehicle electronic devices 10_3.

According to the driver, the display device including the driver and the electronic device including the driver of the present embodiment as explained above, the power consumption of the display device may be reduced.

The foregoing is illustrative of the present inventive concept and is not to be construed as limiting thereof. Although a few example embodiments of the present inventive concept have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific example embodiments disclosed, and that modifications to the disclosed example embodiments, as well as other example embodiments, are intended to be included within the scope of the appended claims. The present inventive concept is defined by the following claims, with equivalents of the claims to be included therein.

What is claimed is:

1. A pixel circuit, comprising:

a first transistor including a gate electrode connected to a first node, a first electrode connected to a second node, and a second electrode connected to a third node;

a second transistor including a gate electrode receiving a data write gate signal, a first electrode connected to a data line transmitting a data voltage, and a second electrode connected to the first node;

a third transistor including a gate electrode receiving a reset gate signal, a first electrode receiving a reference voltage, and a second electrode connected to a fourth node;

a fourth transistor including a gate electrode receiving a first emission signal, a first electrode receiving a first power supply voltage, a second electrode connected to the second node, and a back gate electrode connected to the fourth node;

a boosting capacitor including a first electrode connected to the fourth node and a second electrode connected to the second node; and a light emitting element including an anode electrode connected to a fifth node and a cathode electrode receiving a second power supply voltage, wherein, in a charging period when the boosting capacitor is charged with a voltage difference between the reference voltage and an initial voltage of the second node, the third transistor is turned on, and the fourth transistor is turned off.

2. The pixel circuit of claim 1, wherein the first transistor, the second transistor, the third transistor, and the fourth transistor are NMOS transistors.

3. The pixel circuit of claim 2, wherein, in the charging period, the third transistor is turned on in response to the reset gate signal having a high level to provide the reference voltage to the fourth node.

4. The pixel circuit of claim 3, wherein, in the charging period, the reference voltage is greater than the initial voltage of the second node.

5. The pixel circuit of claim 4, wherein, in the charging period, a threshold voltage of the fourth transistor decreases as the voltage difference between the reference voltage and the initial voltage of the second node increases.

6. The pixel circuit of claim 5, wherein, in an emission period after the charging period, the fourth transistor is turned on when a voltage difference between a high level of the first emission signal and a voltage of the second node is greater than or equal to the threshold voltage of the fourth transistor.

7. The pixel circuit of claim 6, wherein, in the emission period, the voltage difference, which charges the boosting capacitor, between the reference voltage and the initial voltage of the second node is maintained.

8. The pixel circuit of claim 1, wherein the pixel circuit further includes a fifth transistor including a gate electrode receiving an anode initialization gate signal, a first electrode receiving an anode initialization voltage, and a second electrode connected to the fifth node.

9. The pixel circuit of claim 8, wherein the pixel circuit further includes a sixth transistor including a gate electrode receiving a second emission signal, a first electrode connected to the third node, and a second electrode connected to the fifth node.

10. The pixel circuit of claim 9, wherein the pixel circuit further includes a storage capacitor including a first electrode connected to the first node and a second electrode connected to the third node.

11. The pixel circuit of claim 10, wherein the pixel circuit further includes a hold capacitor including a first electrode receiving the first power supply voltage and a second electrode connected to the third node.

12. The pixel circuit of claim 11, wherein the first transistor further includes a back gate electrode connected to the third node.

13. A display device, comprising:

a display panel including a pixel circuit; and a display panel driver configured to drive the display panel, wherein the pixel circuit includes:

a first transistor including a gate electrode connected to a first node, a first electrode connected to a second node, and a second electrode connected to a third node;

a second transistor including a gate electrode receiving a data write gate signal, a first electrode connected to a data line transmitting a data voltage, and a second electrode connected to the first node;

a third transistor including a gate electrode receiving a reset gate signal, a first electrode receiving a reference voltage, and a second electrode connected to a fourth node;

a fourth transistor including a gate electrode receiving a first emission signal, a first electrode receiving a first power supply voltage, a second electrode connected to the second node, and a back gate electrode connected to the fourth node;

a boosting capacitor including a first electrode connected to the fourth node and a second electrode connected to the second node; and a light emitting element including an anode electrode connected to a fifth node, and a cathode electrode receiving a second power supply voltage, and wherein, in a charging period when the boosting capacitor is charged with a voltage difference between the reference voltage and an initial voltage of the second node, the third transistor is turned on, and the fourth transistor is turned off.

14. The display device of claim 13, wherein the first transistor, the second transistor, the third transistor, and the fourth transistor are NMOS transistors.

15. The display device of claim 14, wherein, in the charging period, the third transistor is turned on in response to the reset gate signal having a high level to provide the reference voltage to the fourth node.

16. The display device of claim 15, wherein, in the charging period, the reference voltage is greater than the initial voltage of the second node.

17. An electronic device, comprising:

a display panel including a pixel circuit; and a display panel driver receiving an input signal from an external module, and configured to drive the display panel, wherein the pixel circuit includes:

a first transistor including a gate electrode connected to a first node, a first electrode connected to a second node, and a second electrode connected to a third node;

a second transistor including a gate electrode receiving a data write gate signal, a first electrode connected to a data line transmitting a data voltage, and a second electrode connected to the first node;

a third transistor including a gate electrode receiving a reset gate signal, a first electrode receiving a reference voltage, and a second electrode connected to a fourth node;

a fourth transistor including a gate electrode receiving a first emission signal, a first electrode receiving a first power supply voltage, a second electrode connected to the second node, and a back gate electrode connected to the fourth node;

a boosting capacitor including a first electrode connected to the fourth node and a second electrode connected to the second node; and a light emitting element including an anode electrode connected to a fifth node, and a cathode electrode receiving a second power supply voltage, and wherein, in a charging period when the boosting capacitor is charged with a voltage difference between the reference voltage and an initial voltage of the second node, the third transistor is turned on, and the fourth transistor is turned off.

18. The electronic device of claim 17, wherein the first transistor, the second transistor, the third transistor, and the fourth transistor are NMOS transistors.

19. The electronic device of claim 18, wherein, in the charging period, the third transistor is turned on in response to the reset gate signal having a high level to provide the reference voltage to the fourth node.

20. The electronic device of claim 19, wherein, in the charging period, the reference voltage is greater than the initial voltage of the second node.

* * * * *